United States Patent [19]

Langham

[11] Patent Number: 4,663,204

[45] Date of Patent: May 5, 1987

[54] ELEMENT FROM INTUMESCENT FIRE-PROOF COMPOSITION, AND SPECIFIC METHOD FOR PREPARING SAME

[75] Inventor: Richard J. Langham, St. Peter Port, Channel Islands

[73] Assignee: D.R.I.M. Limited, Great Britain

[21] Appl. No.: 692,940

[22] Filed: Jan. 17, 1985

[30] Foreign Application Priority Data

Feb. 6, 1984 [BE] Belgium .............................. 0/212341

[51] Int. Cl.⁴ ............................................... B32B 3/30
[52] U.S. Cl. ......................................... 428/12; 52/232; 428/137; 428/167; 428/542.8; 428/913; 428/920; 428/921
[58] Field of Search ................ 428/12, 14, 137, 167, 428/60, 920, 921, 542.8, 542.2; 52/232

[56] References Cited

U.S. PATENT DOCUMENTS

| | | | |
|---|---|---|---|
| 4,064,359 | 12/1977 | Peterson et al. | 428/921 |
| 4,276,332 | 6/1981 | Castle | 52/232 |
| 4,467,577 | 8/1984 | Licht | 52/232 |
| 4,493,945 | 1/1985 | Feldman | 428/920 |
| 4,533,588 | 8/1985 | Kraft | 428/167 |

*Primary Examiner*—Paul J. Thibodeau
*Attorney, Agent, or Firm*—Laff, Whitesel, Conte & Saret

[57] ABSTRACT

There is described an intumescent fire-proof element comprised of a plate having on the one side thereof rectilinear grooves allowing folding; a fire-prevention structure comprising between a skeleton and metal sheets, such an element cooperating with means directing the expansion towards a space through which the composition the element is comprised of, may escape outwards; and a method for preparing said composition by contacting a liquid alkaline metal silicate solution with a powder-like hydrophilic substance.

20 Claims, 8 Drawing Figures

ELEMENT FROM INTUMESCENT FIRE-PROOF COMPOSITION, AND SPECIFIC METHOD FOR PREPARING SAME

This invention relates to an element made from a substantially rigid intumescent fire-proof composition, notably based on silicates of alkaline metals, such as sodium or potassium, containing enough water to allow forming a substantially stable foam under the heat action.

One essential object of this invention is to provide an element of the above-defined type which is manufactured with advantageous industrial and economic features, which may be used in very wide fields and for very varied structures to be protected against fire, such as fire-break doors or frames.

For this purpose, the element according to the invention is comprised of a plate having on the one side thereof at least, at least one substantially rectiliner groove extending down to some depth in the plate thickness and from the one edge thereof to another edge, such as the opposite edge, so as to allow bending said plate about said groove.

Advantageously the groove has a cross-section in the shape of a V.

This invention also pertains to a specific method for preparing the fire-proof composition said element is comprised of.

The known compositions of this kind for fire protection, may only be provided as very thin layers. Consequently, said known compositions may be extruded but with difficulty without previously having undergone an additional treatment.

Moreover preparing such compositions generally requires time not to be neglected.

Another important object of the invention is to provide a fire-prevention structure, notably a fire-break door, gate, window, comprising a structure which is essentially formed by a skeleton protected by a heat insulator and a metal sheet on each one of both sides thereof.

Said structure is characterized in that the heat insulator is comprised of at least one intumescent fire-proof composition, the side edge at least being provided with a space through which the intumescent composition can escape outwards from the structure when said composition reaches a temperature higher than the intumescence temperature thereof, means being provided to direct the expanding of the fire-proof composition towards said space at the intumescence temperature thereof.

Still another object of the invention lies in providing a method which allows manufacturing such a fire-proof or fire-prevention composition, which does not have said drawbacks.

For this purpose, the method according to the invention comprises reacting or contacting an aqueous solution of liquid alkaline metal silicate with a hydrophilic powder or granule substance allowing to fix in situ the water from said alkaline metal silicate, so as to form, possibly under pressure, a paste which hardens at room temperature.

Advantageously, said paste or putty is formed at a temperature in the range from 50° to 100° C., which then hardens as it cools down to the room temperature.

The invention finally pertains to the intumescent fire-proof or fire-prevention composition obtained by using the above-defined method.

BRIEF DESCRIPTION OF THE DRAWINGS

In the various figures the same reference numerals pertain to identical or similar parts.

This invention relates more particularly to an element made from a substantially rigid intumescent fire-proof composition, which is based on silicate of alkaline metals, such as sodium and potassium, which contains enough water to allow forming a substantially stable foam under heat action.

Said element is generally comprised of a plate having in the one side at least, at least one substantially rectilinear groove extending down to some depth in the plate thickness and from the open edge thereof to another edge, such as the opposite edge, so as to allow bending said plate about said groove, which thus defines a narrow weakened zone, without causing thereby cracks in the plate.

Figure 1:
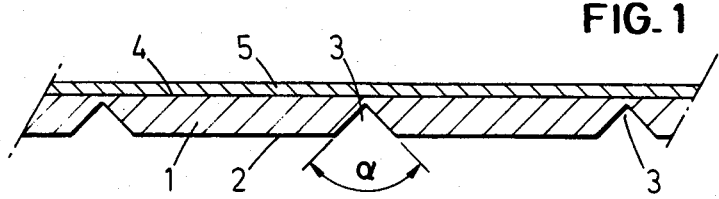
FIG. 1 is a cross-section through part of a fire-proof element according to a first embodiment of the invention.

A first embodiment of such an element has been shown in FIG. 1.

This figure shows a plate 1 based on sodium silicates, the one side 2 of which has at pre-determined spacings, grooves 3 with a V-shaped cross-section, the angle $\alpha$ between the V legs being preferably in the range of 90°. It is thus possible to fold those plate portions lying on either side of a groove 3 at right angle to one another.

The differential between the thickness of plate 1 and the depth of groove 3 is dependent on the resiliency of the fire-proof composition the plate 1 is comprised of, and it generally lies betwen 0.5 and 5 mm, and preferably in the range from 2 to 3 mm.

The very thickness of the plate does vary according to the application being considered, and may for example lie between 5 and 25 mm.

On that side 4 of plate 1 opposite to the side provided with the grooves 3, there is provided a protection or reinforcement layer 5.

Said layer is for example comprised of a film from polyethylene, a film from polyvinyl chloride, a sheet of paper, or else a reflecting metal film, notably from aluminum. Preference will be given to a protection or reinforcement layer comprised of a paper sheet reinforced with cellulose threads, notably cotton. When such a layer 5 is provided, the groove 3 may possibly extend substantially over the whole thickness of plate 1, in such a way that said plate would in such a case be comprised of a sequence of portions bounded by grooves 3.

Advantageously, the plate 1 with the grooves 3 is directly obtained by extruding.

Figure 8:
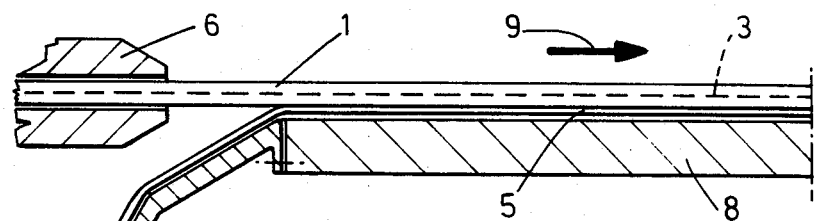
FIG. 8 shows diagrammatically a device for manufacturing the element according to the invention.
Figure 8:
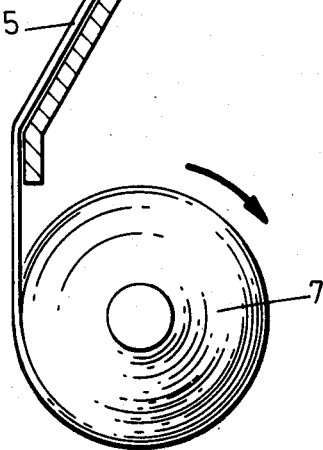

FIG. 8 shows an easy way to also apply directly the reinforcement layer 5 over the side 4 of plate 1 when said plate leaves the head of an extruding machine 6 and is thus still in a more or less adhesive paste-like condition.

As shown in FIG. 8, when said layer is comprised of a sheet or film, it may be unrolled from a roll 7 directly at the outlet from an extruder 6, on a table 8, to move together with the plate coming out of the extruder, along the direction of arrow 9.

In another embodiment, when the layer 5 may be obtained from a paste, said paste may be co-extruded with plate 1, according to known techniques.

Another technique which might possibly be used is the calendering by means of drums having over the cylinderlike surfaces thereof, ribs corresponding to the grooves 3.

Figure 2:
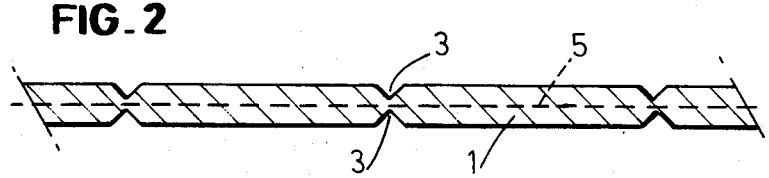
FIG. 2 is a cross-section through part of a fire-proof element according to a second embodiment of the invention.

FIG. 2 shows a second embodiment of the element according to the invention.

In this embodiment, grooves 3 are provided in both sides 2 and 4 of plate 1, in opposite locations, in such a way as to form a narrowing substantially in the middle of the plate thickness.

When necessary, a reinforcement layer 5 formed for example by a netting from textile or metal material, may be provided in the middle plane of said plate 1, as shown in FIG. 2.

Said embodiment has the advantage of being easy to fold in both directions.

Figure 3:
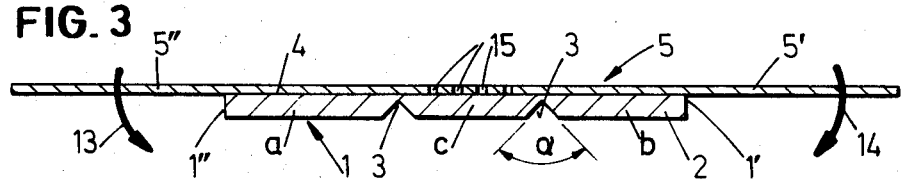
FIG. 3 is a cross-section through a fire-proof element according to a third embodiment of the invention.

FIG. 3 shows a third embodiment of the element according to the invention, which differs relative to the embodiment as shown in FIG. 1, due to the protection or reinforcement layer 5 being comprised of a sheet 5 having two flaps 5' and 5" projecting relative to both lengthwise edges of plate 1, to allow folding said flaps 5' and 5" over the edges 1' and 1" of said plate and over part of side 2 thereof.

This third embodiment is intended for forming a U-shaped channel by folding the end portions a and b of the plate over a 90°-angle in the direction of arrows 13 and 14, about the corresponding grooves 3.

That area of the protection or reinforcement layer 5 which covers the center portion c of plate 1, is provided with holes 15 forming passageways thereto.

Figure 4:
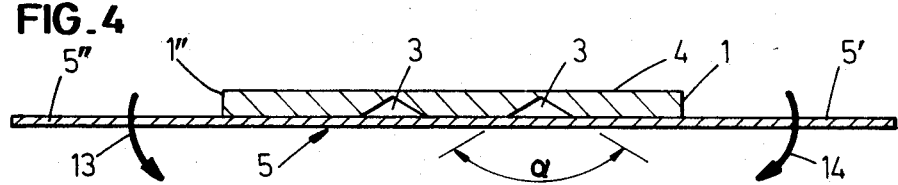
FIG. 4 is a cross-section through a fire-proof element according to a fourth embodiment of the invention.

FIG. 4 shows a fourth embodiment of the element according to the invention which differs essentially relative to the embodiments according to FIGS. 1 and 3 due to the protection or reinforcement layer 5 is provided over the side 2 having the V-shaped grooves, and moreover said grooves form an angle wider than 90°, preferably lying between 90° and 120°, in such a way as to leave a slot between the portions a, b and c of plate 1, when said latter plate 1 is folded in the shape of a U-channel.

It is consequently possible to bring therein the creases of layer 5 which are formed in the groove location during said folding.

Figure 7:
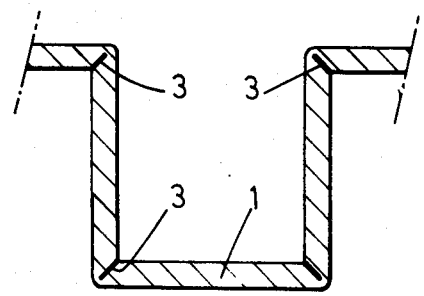
FIG. 7 is a cross-section through another application of a fifth embodiment of the fire-proof element according to the invention.

The fifth embodiment of the element according to the invention as shown in FIG. 7, differs relative to the embodiment as shown in FIG. 2, due to the grooves 3 in both sides 2 and 4 not being located facing one another, but being staggered according to a well-determined design, to allow for example folding the plate in castellated shape.

Figure 5:
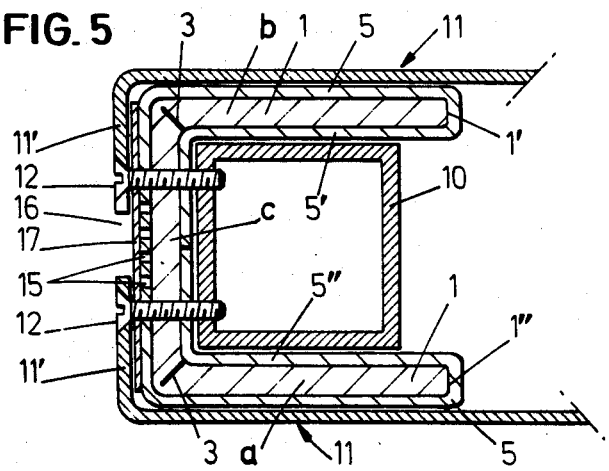
FIG. 5 is a cross-section through a first application of the element as shown in FIG. 1.
Figure 6:
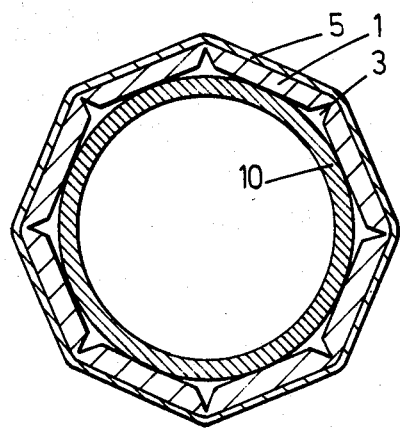
FIG. 6 is a cross-section through a second application of the element as shown in FIG. 1.

FIGS. 5 and 6 pertain to two specific applications of the element according to the invention.

More particularly, FIG. 5 relates to a fire-proof structure, which may for example be a fire-break door, a gate, a window.

In this embodiment as shown in FIG. 5, use is made of an element according to the form as shown in FIG. 3.

The plate 1 has been folded as a U-shaped channel about a metal tube 10, with a square cross-section, which is part of an inner skeleton of a fire-break door for example.

In such a door, the element 1 folded in U-shape is sandwiched between said inner skeleton and outer metal sheets 11.

Said metal sheets are preferably secured with the bent edges 11' thereof, over the door edges by means of screws 12, while taking care to leave a space 16 between said bent edges 11', facing that area of said protection or reinforcement layer 5 which is provided with the holes 15.

A small strip 17 made from an impervious plastic film, such as polyvinyl chloride, having a melting point in the range from 80° to 100° C., is provided between said bent edges 11' and layer 5 to prevent degrading the intumescent composition under the action of atmospheric moisture.

Thus in the case of a fire, under the action of the heat, the metal sheets 11 will begin bulging and from a temperature of 100° C., the intumescent composition the plate 1 is comprised of, will swell and convert into a fluid foam. Due to the presence of the protection or reinforcement layer 5 which deteriorates but on a higher temperature than the foamimg temperature of the intumescent composition, said foam retained captive in said layer 5, can escape but through the holes 15, after melting of the small strip 17, to enter the space 16 and plug in this way rapidly the slit between the door and the frame thereof.

When for example the protection and reinforcement layer 5 is comprised of a sheet from cotton thread-reinforced paper, said layer will burn but from 250° C. approximately.

This mechanism does explain the exceptional holding of this fire-break door type in the case of a fire.

In a similar way, it is possible to use an element as shown in FIG. 4. In such a case however, the layer 5 lies against tube 10 and the flaps 5' and 5" are folded back along the lower side of the metal sheets down to adjacent the bent edges 11' thereof, so as to thus let the foam escape in said space 16 in the case of a fire.

In the embodiment as shown in FIG. 6, the plate is rolled about a tube 10 with a circle-shaped cross-section.

In a particular embodiment of the invention, the fireproof composition the plate 1 is comprised of, is obtained by subjecting to an isothermic hydratation reaction, an alkaline metal silicate, notably a soda silicate, to form at a temperature in the range from 50° to 80° C. obtained due to said isothermic reaction, a paste or putty which during a second step, will harden, for example after the extruding or calendering, as said paste cools down to room temperature.

More particularly, the fire-proof composition may be comprised of the reaction product obtained by close contact between an aqueous solution of liquid alkaline metal silicate and powder or granule hydrophilic substance, which may in turn be comprised of a silicate, allowing to fix in situ the water from said alkaline metal silicate, so as to form possibly under extruding pressure, a paste or putty which hardens at room temperature.

To obtain a product the melting temperature of which is at least about 50° C. and preferably about 90° C., care is taken to retain during said hydratation reaction, the following molar ratio:

$$2.5 \leq \frac{SiO_2}{Me_2O} \leq 4,$$

in which Me is sodium or potassium.

There is preferably retained in the hydratation reaction, a molar ratio which fulfills the relation:

$$3 \leq \frac{SiO_2}{Me_2O} \leq 4 \text{ and notably}$$

$$3 \leq \frac{SiO_2}{Me_2O} \leq 3.6.$$

To obtain such relations, there is added active silica which may easily absorb water, notably micro-crystalline silica or else silica prepared at relatively low temperature. Such silica is for example known under the trzde name "Aerosil".

Said active silica is present in the form of a powder, as it is the case for said anhydrous alkaline silicate.

Said silica may be prepared from molten silicate, which is brought in solution and then cyclone-dried to obtain an atomized powder. The higher the drying temperature and the slower the powder will hydrate back.

As regards the anhydrous silicate, it may be obtained by directly crushing molten silicate, which thus comprises the form in which the alkaline silicate is usually manufactured in the factory.

Said hydratation may advantageously occur in the presence of superhydrated liquid silicate, notably to 30° to 50° Baume and preferably in the range of 38°Baumé, or else in the presence of crystallized silicate with 5 water molecules.

As the superhydrated liquid silicate generally has a molar ratio $SiO_2/Me_2O$ which lies between 3 and 3.8, the addition of active silica might be dispensed with when such a silicate is being used.

On the other hand, when but a commercial anhydrous alkaline silicate is being used, the addition of said active silica proves very useful as for commercial anhydrous alkaline silicate, said molar ratio is generally about 1.

The same is true when crystallized silicate with 5 water molecules is added to said anhydrous silicate.

Mostly for manufacturing the composition according to the invention is a large amount, it is to be preferred that the amount anhydrous silicate being used lie between 50 and 80% by weight relative to the total silicate amount, this to prevent forming a crust due to surface water evaporation caused by the temperature rise resulting from said exothermic reaction.

To impart to the composition a good consistency and avoid flowing thereof as it is applied on vertical surfaces, there is advantageously added a reinforcing armature, such as organic or unorganic fibers, during the preparation of said fire-proof composition before the paste is formed. Said fibers may for example simply be textile fibers, notably cellulose hydrophilic fibers, such as cotton fibers, as there is no drawback in said fibers being carbonized when the composition is subjected to fire.

It is however of interest to avoid said fibers releasing but a minimum amount noxious gases.

Another solution to reinforce the composition lies in first applying the composition as a paste or putty over the side to be coated and then before said paste hardening, pressing therein a reinforcing netting.

According to the invention, the paste is converted into flexible self-adhesive sheets by extruding or calendering, and such sheets are applied over the sides to be protected against fire, in such a way that said sheets are secured directly and closely on said surfaces without requiring using some additional glue.

Said extruding may occur directly from the paste being obtained after contacting the anhydrous silicate with at least one of said reactants, or esle from granules prepared by crushing the hardened paste, which are fed to an extruder.

To prevent the attack by moisture for example, of said sheets, thus applied over the surfaces to be protected, said sheets are covered with a steam-impervious film, such as a film from epoxy resin, polyester, polyurethan, polyvinylidene chloride, chlorinated paraffin, etc.

Another possibility according to the invention lies in converting the paste into rigid foam plates at a temperature lower than 400° C., and preferably in the range from 200° to 250° C.

Said foam plates are preferably prepared by subjecting sheets from said paste to heating with high frequency microwaves.

According to the invention, it is of importance that the foam thus manufactured still contain enough water to be able to go on swelling in the case of fire, to plug the slits present between succeeding plates or the plate support.

As it appears from the above, an essential object of the invention lies in starting for preparing the fire-proof composition, according to the invention, with anhydrous silicate which contains in practice at the most 8% water and generally in the range from 1 to 4% water, and hydrating said silicate up to obtaining a paste-like or hardened silicate, containing from 40 to 60% water, and preferably in the range from 40 to 50% depending on the application being considered.

In this respect it has been noticed that an economical solution for hydrating lies in adding to the anhydrous silicate, a superhydrated silicate as stated above. More generally speaking, it is a matter of mixing a part too-aqueous silicate with a part insufficiently-aqueous silicate.

In some embodiments of the invention, it is actually a matter of a dehydrating in situ of too-aqueous a silicate by adding a product which can fix the water, such as an anhydrous silicate, contrary to what is the case with the known methods where the dehydrating is being obtained by a simple evaporating on the surface of the aqueous solution.

As it appears from the above, the one essential object of the invention lies in an alkaline silicate-based product which will be solid at room temperature and form in hot condition a stable and insulating foam, and this preferably up to at least 900° C.

The foaming agent is generally formed by water, even if some additives allowing to form said stable foam under the heat conditions being considered, are not excluded from the scope of the invention, said additives might for example thus lower the amount water being required in the final product.

In a similar way, one might add to the superhydrated silicate, another product allowing to fix part of the water in said silicate.

The contacting of the anhydrous silicate with superhydrated silicate advantageously occurs inside an extruder. Indeed in this way, the heat from said exothermic reaction comprises a very substantial heat supply to retain the product in paste condition during the extruding.

The examples given hereinafter allow to further illustrate the method for preparing said fire-proof composition as well as the specific features thereof.

EXAMPLE 1

100 parts by weight soda silicate at 50°Be have been mixed with 50 parts by weight anhydrous silicate with 4% water, until obtaining a homogeneous mixture.

Due to the reaction between the anhydrous silicate and the superhydrated silicate solution, the viscosity did increase gradually. Moreover, said reaction being exothermic, the temperature did rise up to about 50° C. while a very thick and tacky paste was being formed.

By letting cool in free air the paste, said paste did harden in less than one minute. There was thus obtained a hard mass which could easily be granulated for the subsequent manufacture by extruding, of flexible sheets or rigid plates.

EXAMPLE 2

Instead of 50 parts anhydrous silicate, use was made of 70 parts, the other conditions being retained unchanged.

EXAMPLE 3

100 parts by weight soda silicate at 50°Be have been mixed with 10 parts by weight colloidal silica. The reaction has been performed inside an autoclave. There was obtained a resilient transparent product, with conchoidal break and thermoplastic.

It must be understood that the invention is in no way limited to the above embodiments and that many changes may be brought thereto, without departing from the scope of the invention as defined in the appended claims.

For instance, the protection or reinforcement layer 5 in a fire-proof structure, might be formed by other means to direct the expanding of the fire-proof composition to the space 16 in the edge of the leaf from a door, a window or a gate, as well as by a protection or reinforcement layer. It might thus be possible for example, to incorporate in said structure a suitable partitioning preventing the fire-proof composition extending inside the fire-prevention structure.

I claim:

1. An intumescent fire-proof element comprising a substantially rigid intumescent fire-proof alkaline metal silicate plate having two longitudinal edges and two ends, a reinforcing layer attached to at least one side of said plate, at least one substantially rectilinear groove extending over some depth in the thickness of the plate from one edge thereof to the other edge, to allow folding said plate about said groove.

2. The element as defined in claim 1, in which said groove has a cross-section in V-shape.

3. The element as defined in claim 1, wherein the plate is an extruded akaline silicate.

4. The element as defined in claim 1, in which the V-shaped groove forms an angle of at least 90°.

5. Element as defined in claim 1, in which the differential between the thickness of said plate and the depth of said groove lies between 0.5 and 5 mm.

6. Element as defined in claim 1, in which the thickness of said plate lies between 5 and 25 mm.

7. The element as defined in claim 1, in which said reinforcement layer is selected from the group consisting of polyethylene film, paper sheet and reflecting metal film.

8. The element as defined in claim 7, in which said reinforcement layer is comprised of a paper sheet reinforced with cotton threads.

9. The element as defined in claim 7, wherein the reinforcement layer projects beyond both edges of said plate to form two flaps, said flaps being sized, to allow folding said flaps over the edges and over part of that plate surface opposite to the one the reinforcement layer is attached to.

10. The element as defined in claim 1, in which at least one area of the reinforcement layer has passageways towards said plate.

11. The element as defined in claim 1, in which the reinforcement layer is attached to the surface provided with V-shaped grooves.

12. Element as defined in claim 11 in which the V-shaped grooves form an angle lying between 90° and 120°.

13. The element as defined in claim 2, in which the reinforcement layer has a heat resistance higher by at least 100° C., than the intumescence temperature of the fire-proof composition.

14. The element as defined in claim 1, wherein the reinforcement layer is applied by co-extruding over at least one surface of said plate.

15. The element as defined in claim 1, in which the fire-proof composition is based on alkaline metal silicates obtained by close-contacting an aqueous solution of liquid alkaline metal silicate with a powder- or granule-like hydrophilic substance and allowed to fix in situ the water from said alkaline metal silicate to form a paste which hardens at room temperature.

16. Element as defined in claim 15 in which said fire-proof composition comprises between 40% and 60% by weight water relative to the total weight of silicate.

17. Element as defined in claim 1, in which said fire-proof composition has a molar ratio which fulfills the following relation:

$2.5 \leq SiO_2/Me_2O \leq 4$, in which Me is K or Na.

18. The element as defined in claim 17, in which said relation is selected from:

$3 \leq SiO_2/Me_2O \leq 4$, and
$3 \leq SiO_2/Me_2O \leq 3.6$.

19. A fire-prevention structure, selected from a fire-break door, gate, and window, comprising a skeleton protected by a heat insulator, and by a metal sheet over both sides thereof said heat insulator being the intumescent fire-proof element of claim 2, at least the side edges of said structure having a space through which intumescent fire-proof composition can escape outside the structure when a higher temperature than the intumescence temperature is reached, and means being provided to direct the expanding of fire-proof composition towards said space at the intumescence temperature thereof.

20. A fire-prevention structure, selected from a fire-break door, gate, and window comprising a skeleton protected by a heat insulator, and by a metal sheet over both sides thereof, said heat insulator being the intumescent fireproof element of claim 9, at least the side edges of said structure having a space through which intumescent fire proof composition can escape outside the structure when a higher temperature than the intumescence temperature is reached, and means being provided to direct the expanding of fire-proof composition towards said space at the intumescence temperature thereof, and with said grooves being V-shaped, said flaps being folded about the edges against the other plate side to thus prevent the expansion of the fire-proof composition outside said edges.

* * * * *